(12) United States Patent
Jacobs (10) Patent No.: US 10,182,673 B2
(45) Date of Patent: Jan. 22, 2019

(54) CONTAINERS WITH REMOVABLE APPLIQUES

(71) Applicant: Amscan Inc., Elmsford, NY (US)

(72) Inventor: Stephen Jacobs, Youngstown, OH (US)

(73) Assignee: Amscan Inc., Elmsford, NY (US)

( * ) Notice: Subject to any disclaimer, the term of this patent is extended or adjusted under 35 U.S.C. 154(b) by 0 days.

(21) Appl. No.: 14/802,613

(22) Filed: Jul. 17, 2015

(65) Prior Publication Data

US 2016/0015197 A1 Jan. 21, 2016

Related U.S. Application Data

(60) Provisional application No. 62/162,260, filed on May 15, 2015, provisional application No. 62/026,070, filed on Jul. 18, 2014.

(51) Int. Cl.

| *A47G 19/22* | (2006.01) |
|---|---|
| *B32B 27/32* | (2006.01) |
| *B32B 7/06* | (2006.01) |
| *B32B 7/12* | (2006.01) |
| *B32B 27/08* | (2006.01) |
| *B32B 27/10* | (2006.01) |
| *B32B 27/36* | (2006.01) |

(52) U.S. Cl.
CPC ............ *A47G 19/2227* (2013.01); *B32B 7/12* (2013.01); *B32B 27/08* (2013.01); *B32B 27/10* (2013.01); *B32B 27/36* (2013.01); *B32B 7/06* (2013.01); *B32B 27/32* (2013.01); *B32B 2255/10* (2013.01); *B32B 2255/12* (2013.01); *B32B 2255/26* (2013.01); *B32B 2307/518* (2013.01); *B32B 2307/748* (2013.01); *B32B 2307/75* (2013.01); *B32B 2439/00* (2013.01); *B32B 2451/00* (2013.01); *B32B 2519/00* (2013.01)

(58) Field of Classification Search
CPC ...... A47G 19/2227; B32B 7/06; B32B 27/32; B32B 2439/00; B32B 2307/518; B32B 2307/748; B32B 2451/00; B32B 7/12; B32B 27/08; B32B 27/10; B32B 27/36; B32B 2307/75; B32B 2255/10; B32B 2255/12; B32B 2255/26; B32B 2519/00; Y10T 428/14; Y10T 428/1476; Y10T 428/1486; Y10T 428/149; Y10T 428/1495
See application file for complete search history.

(56) References Cited

U.S. PATENT DOCUMENTS

| 581,494 A | 4/1897 | Schwab |
|---|---|---|
| 2,563,340 A | 8/1951 | Kelly |

(Continued)

*Primary Examiner* — Patricia L. Nordmeyer
(74) *Attorney, Agent, or Firm* — Neal J. McLaughlin; Alston & Bird LLP (57) ABSTRACT

In an example embodiment, there is disclosed herein a sleeve that has a peel-off appliqué or label that includes desired graphics that can be combined with a drink cup or container. The label or appliqué or "collectable" acts as a "mini-poster" that is removable and repositionable. The label may have graphics of sports starts or other things such as musical performers, super heroes, etc. Particular embodiments include interior die cut images within the main graphic as "collectibles within a collectible." In another example embodiment, a container appliqué is applied to the container.

20 Claims, 10 Drawing Sheets

(56) References Cited

U.S. PATENT DOCUMENTS

| | | | |
|---|---|---|---|
| 3,638,340 A * | 2/1972 | Gottschalk | G09F 3/0288 283/103 |
| 3,914,483 A * | 10/1975 | Stipek, Jr. | G09F 3/0288 283/101 |
| 3,967,022 A | 6/1976 | Hasei | |
| 4,648,548 A | 3/1987 | Shin | |
| 5,352,155 A * | 10/1994 | Fahey | B41L 1/22 283/81 |
| 5,620,764 A * | 4/1997 | Schwarz | B44C 1/105 428/187 |
| 5,639,529 A | 6/1997 | Gozdecki et al. | |
| 5,676,401 A | 10/1997 | Witkowski et al. | |
| 5,704,648 A | 1/1998 | Brown et al. | |
| 5,829,789 A * | 11/1998 | Treleaven | B65D 23/003 283/101 |
| 5,881,597 A | 3/1999 | Brooks | |
| 6,709,726 B1 | 3/2004 | Dronzek, Jr. et al. | |
| 6,733,855 B1 * | 5/2004 | Scott | G09F 3/10 283/81 |
| 7,172,668 B2 | 2/2007 | Key | |
| 2003/0056410 A1 * | 3/2003 | Witkowski | G09F 3/0288 40/310 |
| 2003/0217489 A1 * | 11/2003 | Witkowski | B44C 1/175 40/306 |
| 2004/0221944 A1 * | 11/2004 | Havard | B65C 3/16 156/230 |
| 2005/0153091 A1 * | 7/2005 | Challoner | G09F 3/10 428/42.3 |
| 2006/0251845 A1 * | 11/2006 | Miles | G09F 3/0288 428/42.3 |
| 2009/0246427 A1 * | 10/2009 | Hincks | G09F 3/0288 428/34.1 |
| 2010/0293821 A1 * | 11/2010 | Sullivan | G09F 3/02 40/1 |
| 2012/0244516 A1 * | 9/2012 | Pertzborn-Whiting | A63H 33/00 434/428 |
| 2014/0093862 A1 * | 4/2014 | Lauderdale | B44C 1/105 434/428 |

* cited by examiner

CONTAINERS WITH REMOVABLE APPLIQUES

CROSS REFERENCE TO RELATED APPLICATIONS

This application is claims the benefit under 35 U.S.C. § 119(e) to U.S. Provisional Patent Application No. 62/162,260 filed on May 15, 2015 and to U.S. Patent Application No. 62/026,070 filed on Jul. 18, 2014, the contents of which are herby incorporated by reference herein in their entirety.

TECHNICAL FIELD

This disclosure is directed to a container or a sleeve for a container that has a peel-off appliqué or label that includes desirable graphics that can be combined with a drink cup or container.

BACKGROUND

Drinking cups are widely used to distribute beverages at public events, such as sporting events. The cups may have a generally frusto-conical shape. The cups may have labels that are shaped to match the form of the frusto-concial shape of the cup. A pressure sensitive adhesive may be employed to bond the label to the cup.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an example embodiment, there is disclosed herein a sleeve that has a peel-off appliqué or label that includes desired graphics that can be combined with a drink cup or container. The label or appliqué or "collectable" acts as a "mini-poster" that is removable and repositionable.

In an example embodiment, there is disclosed herein a container appliqué that is applied to a container. A release layer allows the appliqué to be removed from the cup. The appliqué can then be removed from the release layer and the appliqué can be applied to another surface.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, there is disclosed herein a sleeve that has a peel-off appliqué or label that includes desired graphics that can be combined with a drink cup or container. The label or appliqué or "collectable" acts as a "mini-poster" that is removable and repositionable. The label may have graphics of sports starts or other things such as musical performers, super heroes, etc. Particular embodiments include interior die cut images within the main graphic as "collectibles within a collectible."

The label, once removed from the sleeve, can be applied on a self-stick basis with a repositionable adhesive or by static cling to a wall or any other surface. In an example embodiment, the sleeve can be made by machinery to form the sleeve as a substrate (e.g., basically a bottomless cup). The label material is printed and die cut. The label material is edge glued and formed around a mandrel. The label seam is tamped closed. The sleeve is applied to cup or container (known as post or secondary decoration) in an automated process. In an example embodiment, the Label Materials comprise a 2.4 mil Face Stock (such as for example, a white, top coated BOPP (Bi-axially Oriented Polypropylene or other similar material), al mil Repositionable Adhesive or other similar removable or permanent adhesive, and a 1.5 mil PET Silicone Coated Release Liner or similar release film or release paper liner. Those skilled in the art should readily appreciate that the dimensions, shapes, and materials described herein are selected merely for ease of illustrations and that the principles described herein can apply to other similar sizes, shapes, and materials.

Figure 1:
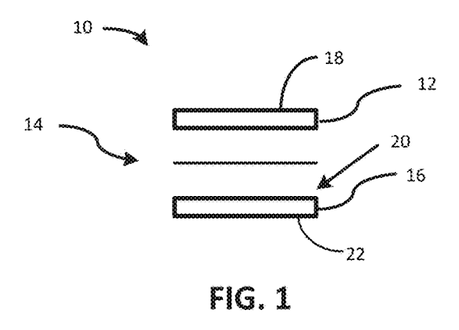
FIG. 1 is an exploded view of a container appliqué

As set forth above and in FIG. 1, illustrates a representative embodiment of a reusable container appliqué, or "container appliqué" 10 in accordance with the present disclosure includes an appliqué layer 12, which may be for example any suitable material and preferably printable material, suitable as face stock, an example of which is top-coated bi-axially oriented polypropylene (BOPP), or similar material, of any suitable thickness, such as, for example, a thickness of 2.4 mil. The appliqué 12 carries printing 18 and is adhered to an appliqué release layer 16, such as 1.5 mil PET silicone release liner, or similar release film or release paper liner, by 1 mil layer of appliqué adhesive 14, which may be any suitable removable or permanent adhesive.

In an example embodiment, the release layer (or liner) 16 may also have printed matter. The printed matter may be on either or both of sides 20 and 22. For example, coupons, game pieces, reward, or any other desired printing may be disposed on either or both of sides 20 and 22.

Die cut patterns of representative containers, such as cups made of paper or other materials in sheet form or molded are disclosed. The container appliqué 10 may be applied to any surface of plastic containers or cups. Representative container sizes, with which the container appliqués 10 can be combined, include but are not limited to 12 oz.-44 oz. size "cold cups" or "hot cups" made of paper-containing materials or other similar materials; 130 oz. and 170 oz. popcorn buckets; and 12 oz.-64 oz. plastic cold cups and 128 oz. and 166 oz. plastic popcorn buckets.

For application to tapered style cups, the container appliqué 10 is preferably crescent shaped, and dimensioned for application to the major planar areas of the cup die cut pattern. In a particular embodiment, the container appliqué 10 is generally crescent shaped and corresponds in shape to the die cut pattern for a sheet-formed cup or container, as shown. A tab may be provided on one lateral edge of the container appliqué 10 to facilitate removal of the appliqué layer 12 with the repositionable adhesive 14, or any suitable removable or permanent adhesive, from the release layer 16. The tab may be an extension of the appliqué material layer 12, appliqué adhesive 14 and the appliqué release layer 16 beyond the lateral edge of a seam formed when the substrate 24 (FIG. 2) is formed into a sleeve (see e.g., FIG. 3).

Figure 2:
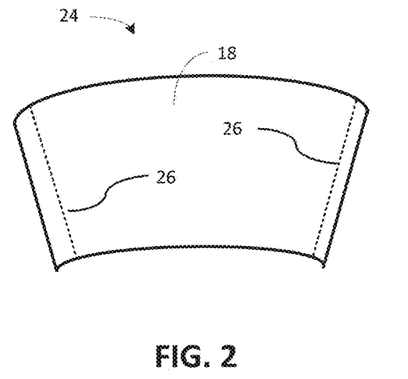
FIG. 2 illustrates an example of a container appliqué before the container appliqué is formed into a cone.

FIG. 2 illustrates an example of a substrate 24 that illustrates container appliqué 10 before the container appliqué 10 is formed into a cone or sleeve. Kiss cuts 26 along the sides of the substrate allow the printed material of the container appliqué 10 to be removed from the cone.

Figure 3:
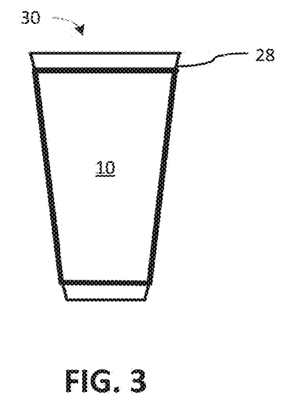
FIG. 3 is a side view of a container appliqué applied to a cup.

FIG. 3 is a side view of a container appliqué applied 10 to a cup 30. In an example embodiment, the lip 28 of the cup 28 is employed to hold the container appliqué 10 onto the cup 30. For example, the container appliqué 10 may slide towards 28 and engage lip 28 to hold the container appliqué 10 in place. To remove the container appliqué 10 from the cup 30, the container appliqué 10 is slid in a direction away from the lip 28 of the cup 30.

Figure 4:
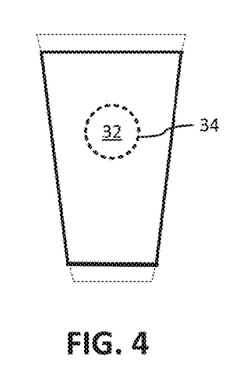
FIG. 4 is a side view of a container appliqué having a cutout section.
Figure 5:
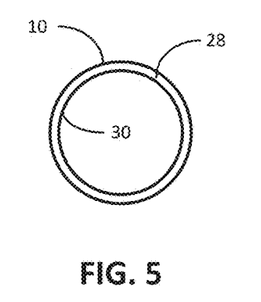
FIG. 5 is a top view of a container appliqué applied to a cup.

FIG. 4 is a side view of a container appliqué 10 having a cutout section. 32. Although FIG. 4 illustrates a single cutout, those skilled in the art can readily appreciate that the container appliqué 10 may have any physically realizable number of cutouts and the number of cutouts shown was merely selected for ease of illustration. Knife cuts 34 may be employed to form the cutouts. FIG. 5 is a top view of a container appliqué applied 10 to a cup 30.

Figure 6:
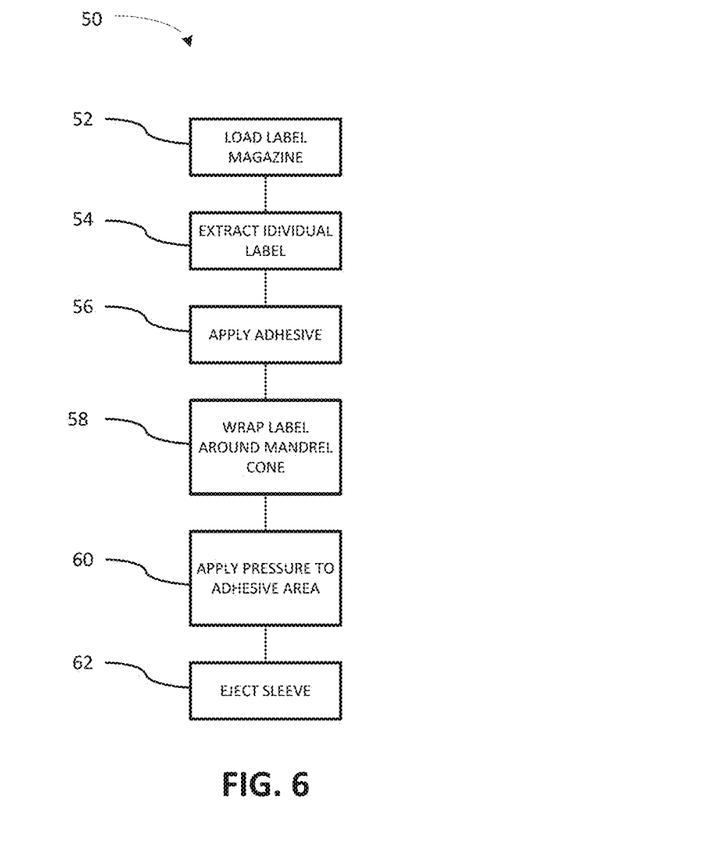
FIG. 6 is a block diagram illustrating a methodology for manufacturing a container appliqué.
Figure 7:
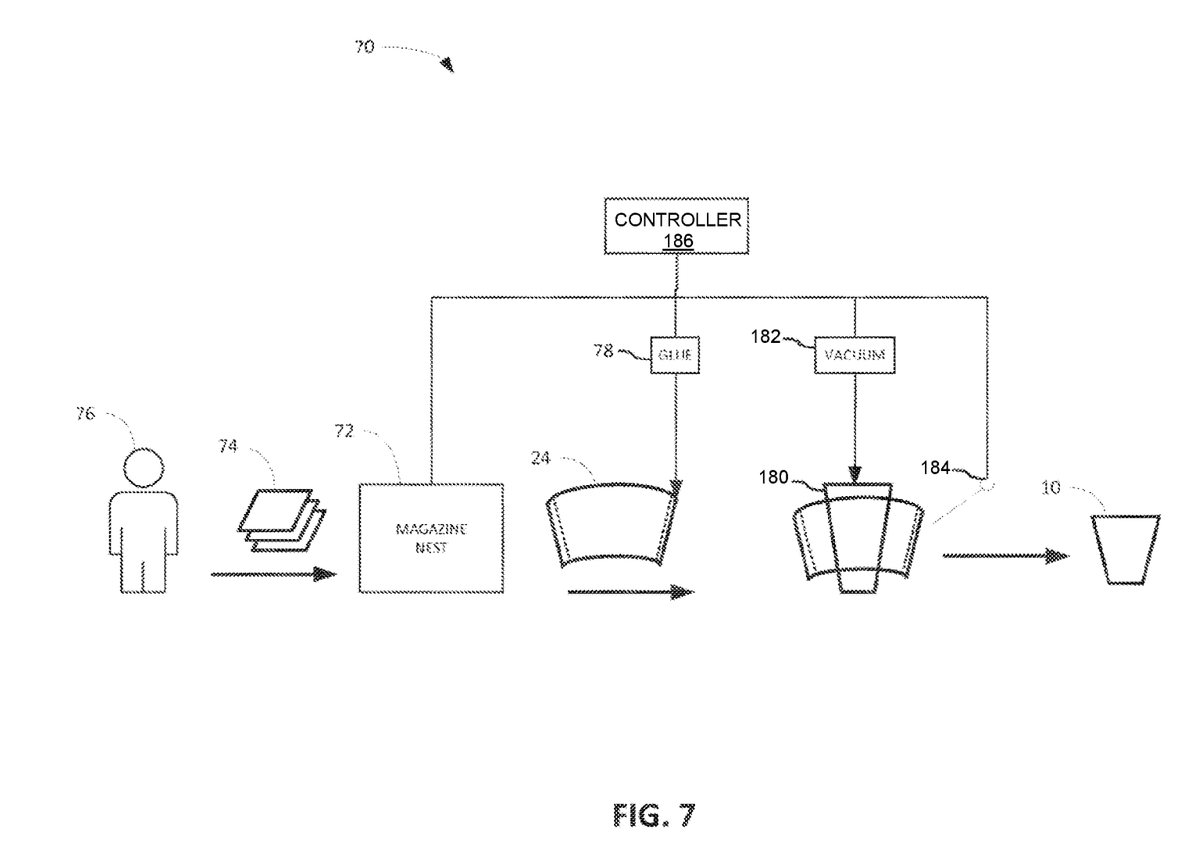
FIG. 7 illustrates an example of the state of the container appliqué while the actions in FIG. 6 are being performed.

FIG. 6 is a block diagram illustrating a methodology 50 for manufacturing a container appliqué. FIG. 7 illustrates an example of the state of the container appliqué while the various actions in FIG. 6 are being performed. FIG. 7 further illustrates an automatic sleeve forming system comprises an operator-load label magazine nest 70, a forming mandrel station 180 with actuating wings (not shown), a vertical tamping unit 184, an automatic glue dispensing station 78, a sleeve off-loader (not shown) with stacking magazine (now shown), and a controller 186, such as a PLC control panel.

At 52, Die-cut and stacked label stock 74 will be loaded into a vertical magazine nest (by an operator 76, although in other embodiments the label stock 74 may be auto loaded).

In an example embodiment, the printed material 18 and kiss cuts 26 are included in the Die-Cut stacked label stock 74.

At 54, Labels 24 will be extracted one at a time from the bottom of the magazine nest 72 and pushed forward into the forming station 180. At 56, while the label 24 is moving towards the forming station, an adhesive is applied to the label 24 by glue station 78. The adhesive may be glue in a flat swirl-spray pattern, double sided tape, or any suitable adhesive. In example embodiments, the adhesive may be applied to any edge, on either the top or bottom side.

At 58, once a single label 24 is in position, pneumatically actuated forming wings will accurately wrap the label around a stationary mandrel cone. The mandrel is designed to hold the label in position for accurate wrapping and a vacuum system 182 is used to assist in wrapping and to confirm a "sleeve" is present.

At 60, once the label substrate 24 is wrapped around the forming mandrel, a vertical tamping arm 184 will index down and apply pressure onto the glued area to finalize the bond process. At 62, the completed "sleeve" (or cone) 10 will then eject into a stacking magazine nest.

The controller 186 is a programmable controller operates the system that controls the operation of label magazine nest 72, glue station 78 forming mandrel station 180 (including vacuum 182). In an example embodiment, the controller 186 comprises logic for implementing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discreet logic such as an application specific integrated circuit (ASIC), a programmable/programmed logic device, memory device containing instructions, or the like, or combinational logic embodied in hardware. Logic may also be fully embodied as software that performs the desired functionality when executed by a processor.

In an example embodiment, there is disclosed herein an Container appliqué that is configured for initial application to containers such as food containers including cups and bottles of various sizes and shapes. In an example embodiment, a release substrate which carries one or more adhesively repositionable printed film appliqués is applied to a container, either directly or combination with other layers. The reusable appliqué, (also referred to herein as "label" or "labels" or "appliqué") is in an example embodiment in the form of a printed film or paper-based piece with one or more printed and die cut pieces which are removable from an underlying release layer. The labels or appliqués can serve as miniature posters, emblems, stickers or the like. The labels may have graphics of sports stars and other things such as musical performers, super heroes, etc. Additional interior die cut images may be included within the main graphic as 'collectibles within a collectible'.

The label is applied to a container such as a cup with a permanent adhesive to secure the entire laminate label construction. When the collectible label is removed from the cup, two layers of film (base and mid) that are connected by a dry bond-like component are peeled off the permanently affixed substrate layer applied directly to the exterior surface of the container. The container or cup or bottle with permanent adhesive is discarded after use.

Figure 8:
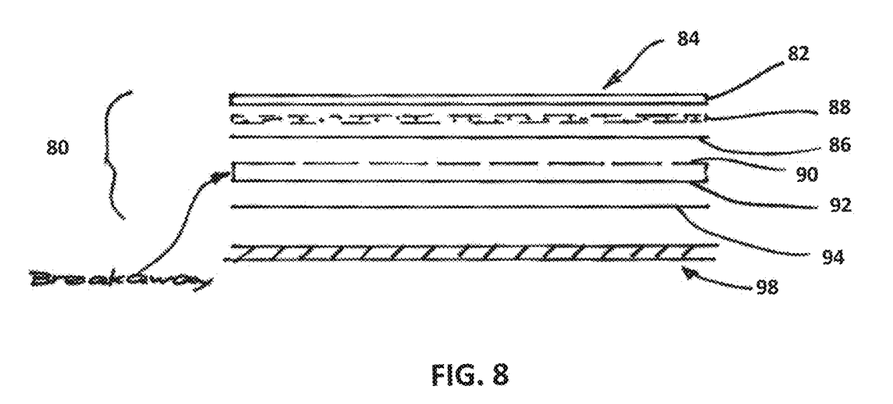
FIG. 8 illustrates an example of the layers of a container appliqué.

FIGS. 8-14 illustrate an example of a container appliqué that is applied to a container. Referring to FIG. 8, the container appliqué may suitably comprise a 2.4 mil Face Stock (such as for example a white, top coated BOPP (Bi-axially Oriented Polypropylene or other similar material), a 1 mil Repositionable Adhesive, a 1.5 mil PET Silicone Coated Release Liner or other similar release film or release paper liner, a 1.5 mil Breakaway System and permanent adhesive, and a 1.5 mil PET Silicone Coated Release Liner or other similar release film or liner that protects the base adhesive and is discarded in the label application process. Those skilled in the art should readily appreciate that although the container appliqué is described herein in terms of singles layers, the label construction may also be multi-layered or "piggyback."

Figure 9:
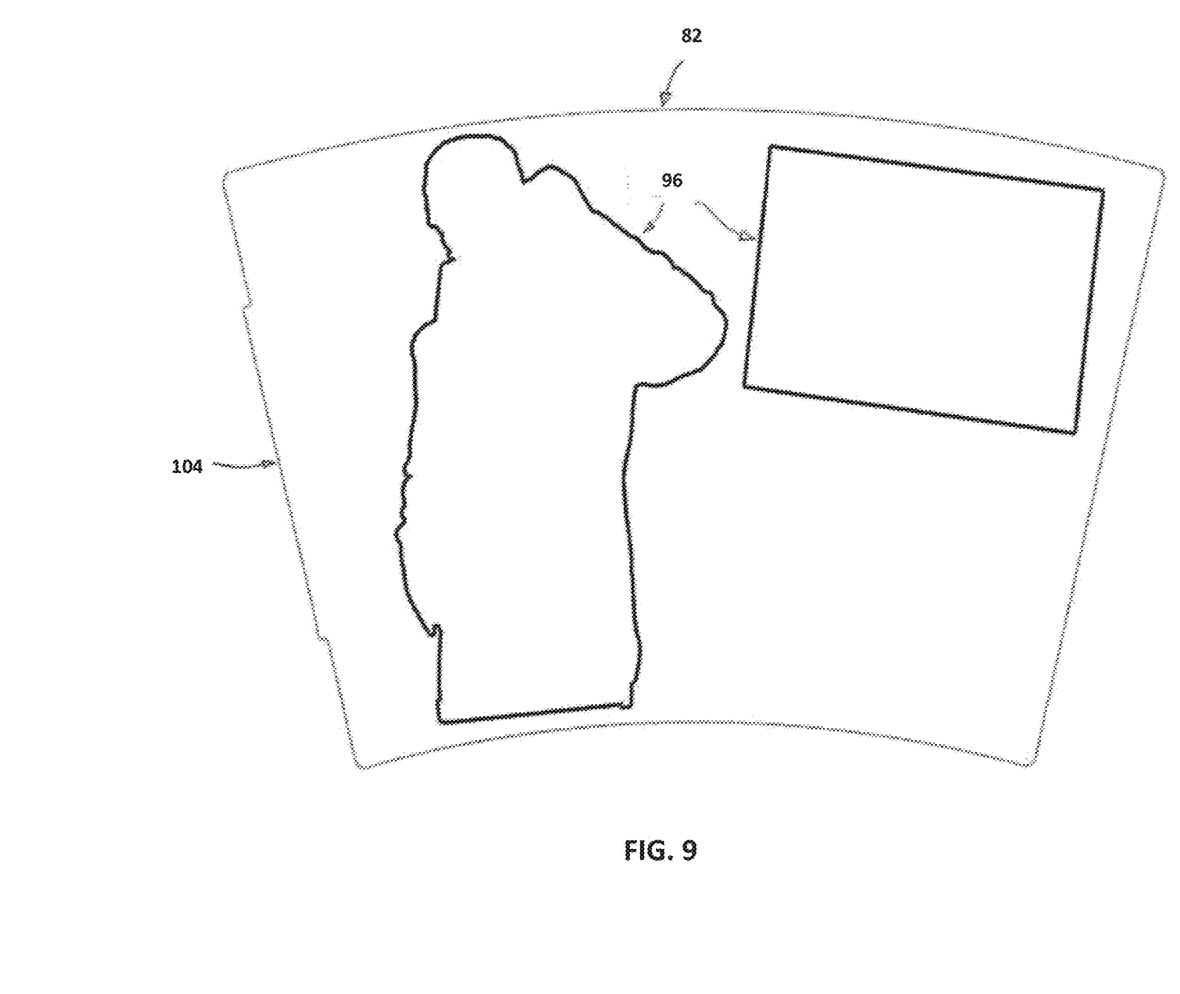
FIG. 9 illustrates an example of a container appliqué with multiple cut outs.
Figure 10:
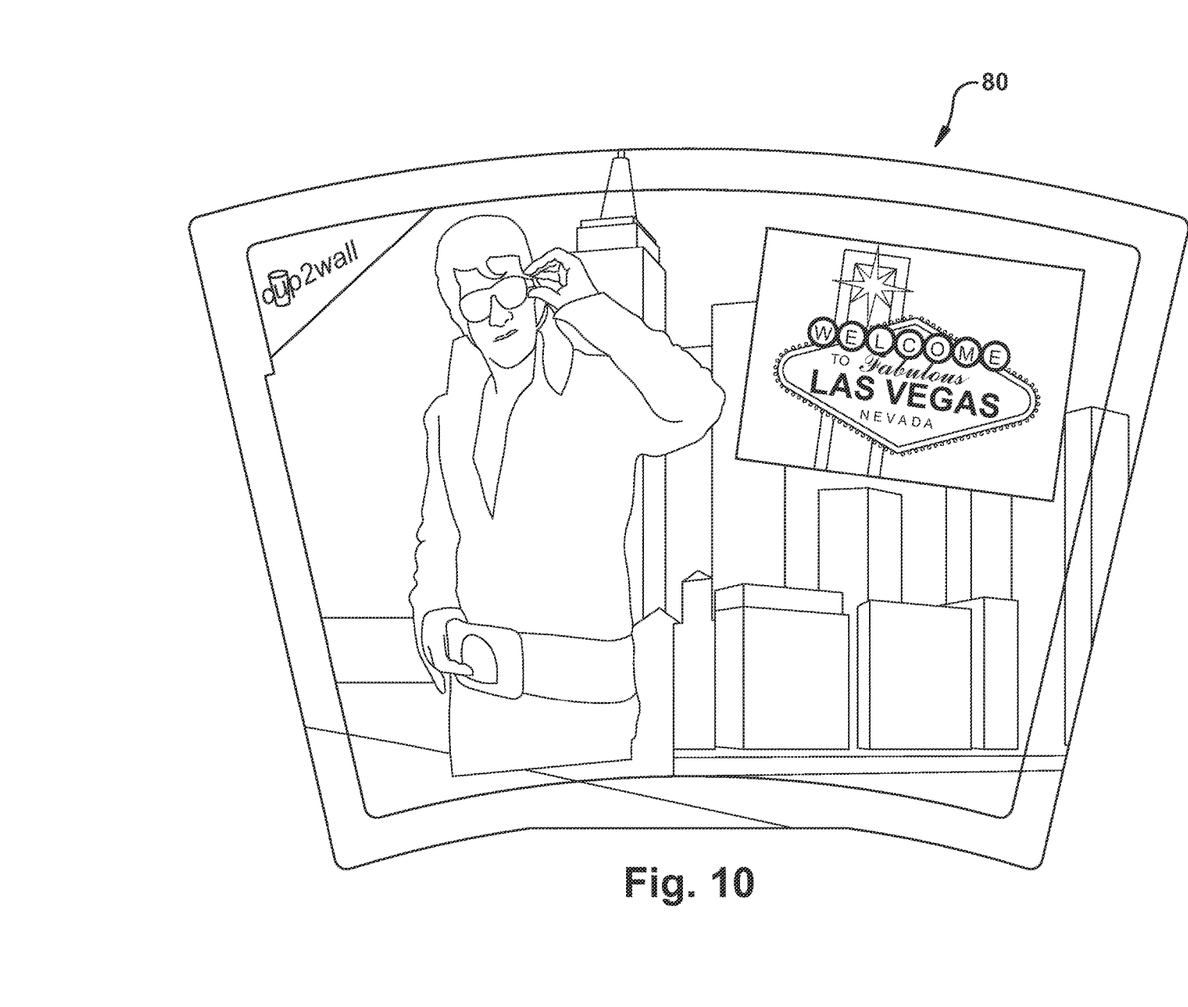
FIG. 10 illustrates an example of a container appliqué.

As set forth above, a representative embodiment of a reusable container appliqué, or "container appliqué" 80 in accordance with the present disclosure includes an appliqué layer 82, which may be for example any suitable material, such as, for example, a printable material, suitable as face stock, for example a top-coated bi-axially oriented polypropylene (BOPP), or other similar material, of any suitable thickness, such as for example a thickness of 2.4 mil. The appliqué layer 82 carries printing 84 and is adhered to an appliqué release layer 86, such as 1.5 mil PET silicone release liner, or some similar release film or release paper liner, by a 1 mil layer of appliqué adhesive 88, or similar removable or permanent adhesive. The appliqué 82, appliqué adhesive 88 and appliqué release layer 86 are combined with a breakaway layer which includes a breakaway release material 90 in contact with the appliqué release 86, and a breakaway permanent adhesive 92, or other suitable permanent or removable adhesive. In an example embodiment, a breakaway release layer 94 is applied over the breakaway adhesive 92, for packaging and handling of the container appliqué prior to application to a container. As indicated in FIG. 9, the appliqué layer 82 may include or be divided by one or more cutouts 96 in any form and carrying any form of print or other indicia, as shown for example in FIG. 10. Those skilled in the art should readily appreciate that the dimensions and materials here are selected merely for ease of illustrations and that the principles described herein can apply to other similar sizes and materials. Moreover, those skilled in the art should readily appreciate that some embodiments may not include all of the layers described above. For example, some example embodiments may not include the breakaway permanent adhesive 92, the breakaway and/or the breakaway layer.

Figure 11:
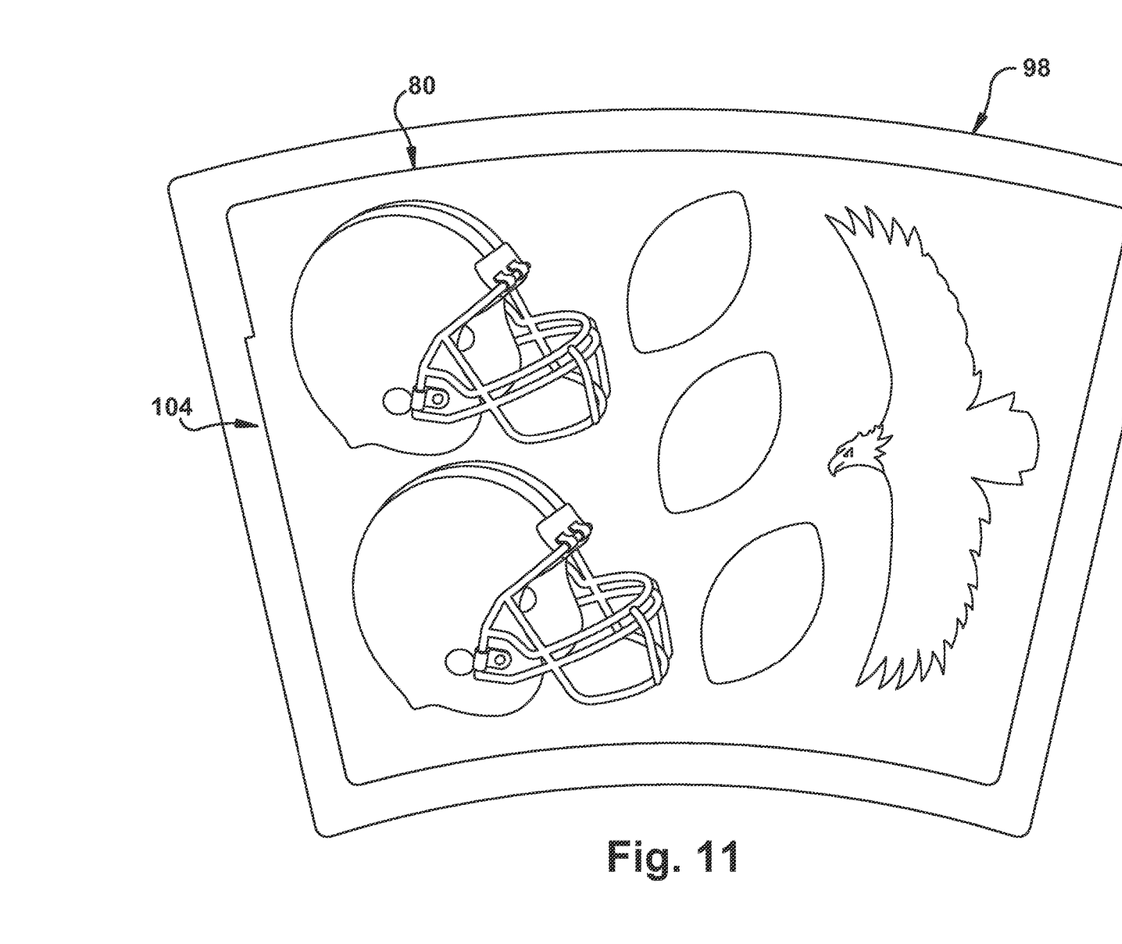
FIG. 11 illustrates an example of die cut patterns on a container appliqué.

As shown in FIG. 11, die cut patterns of representative containers, such as cups made of paper or other materials in sheet form or molded are combined with the container appliqués 80. The container appliqué may be applied to any non-critical or hot zone structural areas of such containers or to any surface of plastic containers or cups, such as those produced by International Paper and similar products. Representative container sizes with which the container appliqués 80 can be combined are disclosed, including but not limited to 12 oz.-44 oz. size "cold cups" or "hot cups" made of paper-containing materials; 130 oz. and 170 oz. popcorn buckets; and 12 oz.-64 oz. plastic cold cups and 128 oz. and 166 oz. plastic popcorn buckets.

Figure 12:
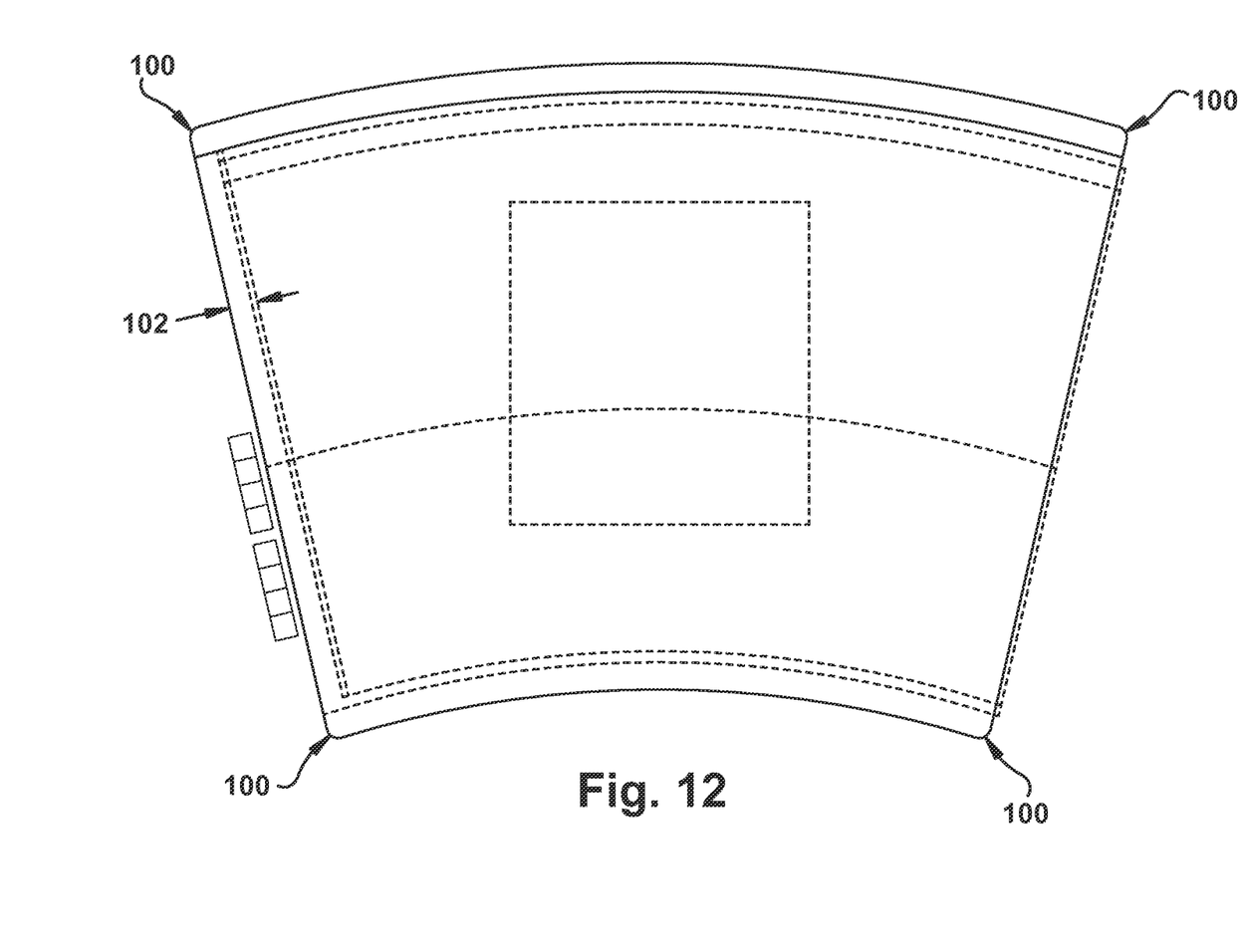
FIG. 12 illustrates an example of a container appliqué cut in the shape of a frusto-conical cup.

For application to tapered style cups, the container appliqué 80 is preferably crescent shaped, and dimensioned for application to the major planar areas of the cup die cut pattern 98 and without interfering with the rolled lip or bottom attachment areas indicated at 100, or the seam as indicated at 102, as indicated in FIG. 12. In an example embodiment, the container appliqué 80 is generally crescent shaped and corresponds in shape to the die cut pattern for a sheet-formed cup or container, as shown. In particular embodiments, the container appliqué 80 covers a substantial area of the cup material die pattern. A tab 104 may be provided on one lateral edge of the container appliqué 80 to facilitate removal of the appliqué 82 with the repositionable adhesive 88 from the release layer 86. The tab 104 may be an extension of the appliqué material layer 82, appliqué adhesive 88 and the appliqué release layer 86 beyond the lateral edge of the breakaway, whereby the container appliqué 80 can be removed correctly from the container by separation from the breakaway release 90, transported, and then applied by removal of the appliqué release 86.

Figure 13:
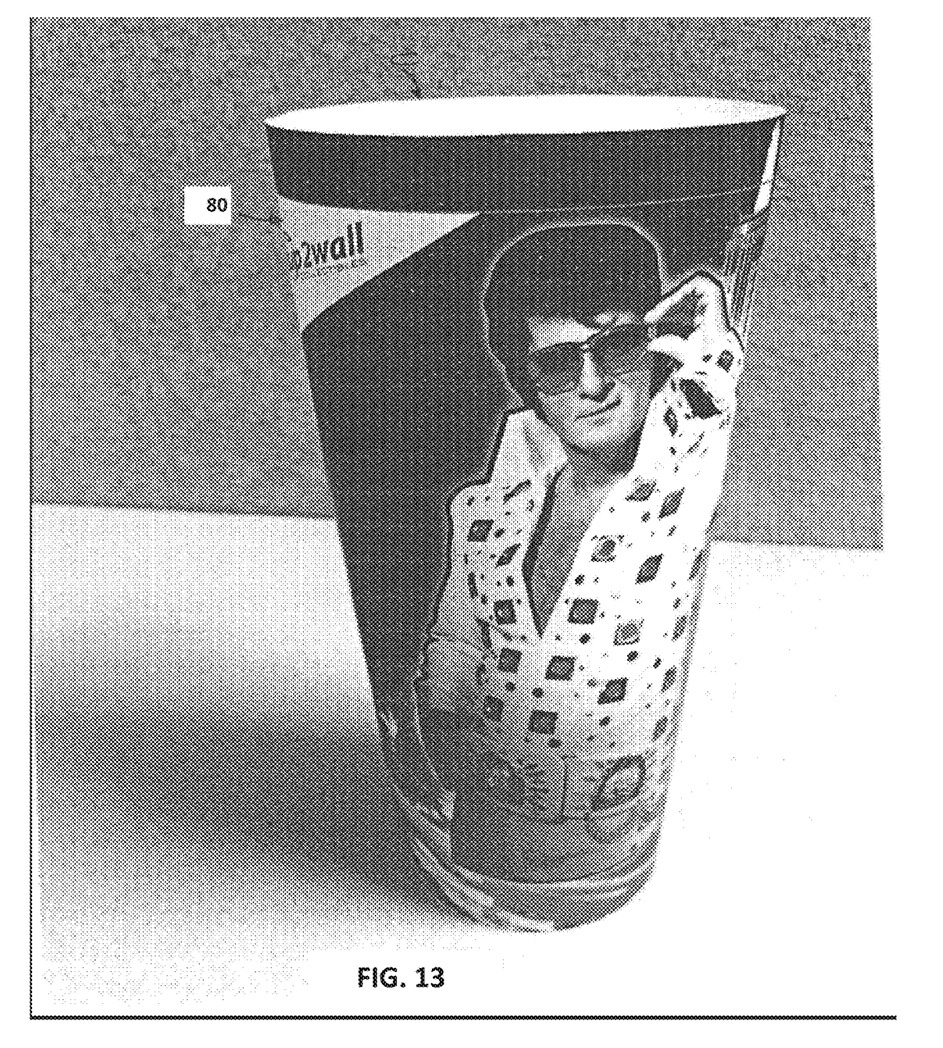
FIG. 13 illustrates an example of a container appliqué applied to an exterior surface of a container.
Figure 14:
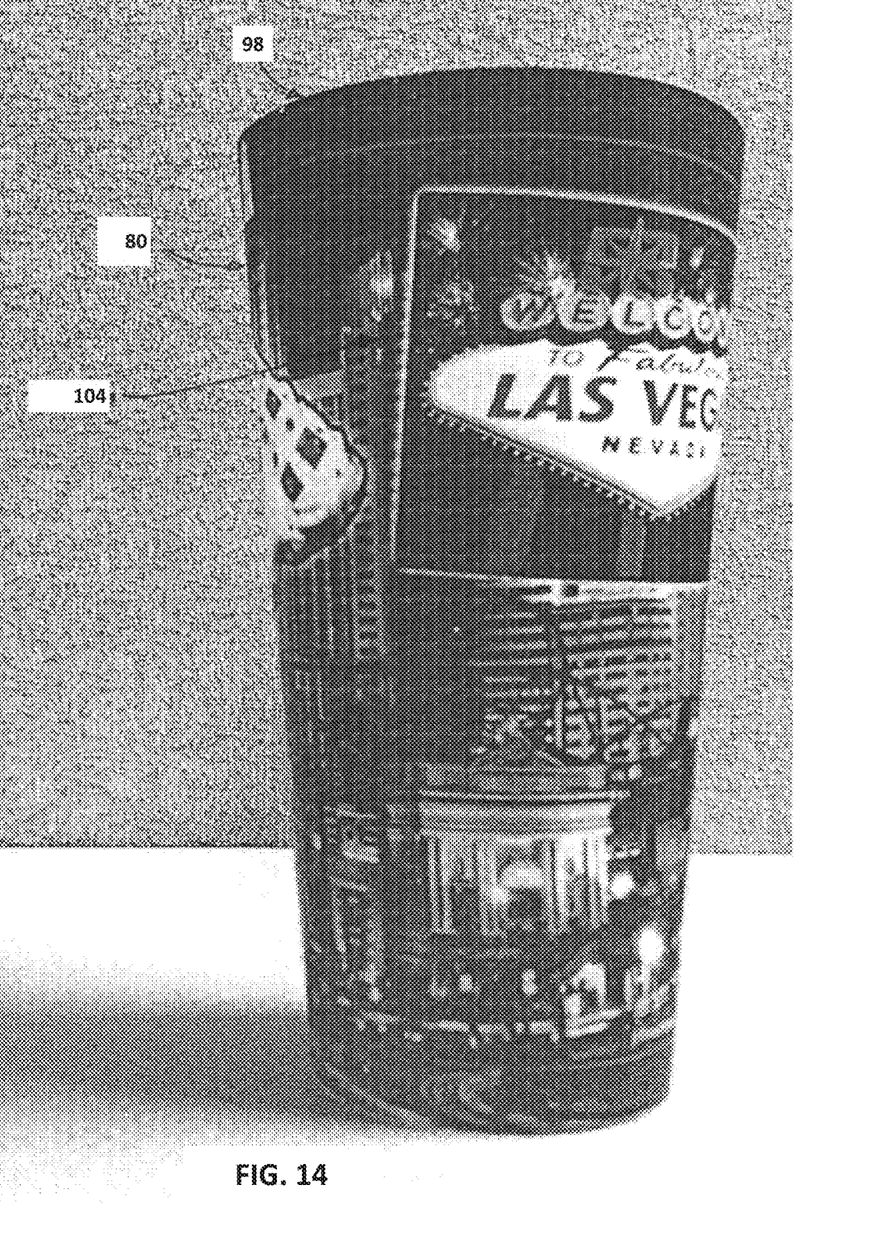
FIG. 14 illustrates another example of a container appliqué applied to an exterior surface of a container.

As shown in representative form in FIG. 13 and FIG. 14, container appliqués 80 are applied to the exterior surface of a container 98, such as a paper or plastic cup or bucket to substantially encircle the container and substantially cover the entire exterior surface. The container appliqué 80 can then be easily removed from the container by gripping the tab 102 for removal from the exterior surface of the container 98.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. A container, comprising:
an appliqué layer having first and second sides, the first side having printing thereon;
a breakaway layer;
a repositionable appliqué adhesive applied to the second side of the appliqué layer, repositionably adhering the appliqué layer to the breakaway layer;
a container body; and
a permanent breakaway adhesive coupling the breakaway layer with the container body,
wherein the appliqué layer includes at least one kiss cut therethrough defining a cutout portion of the appliqué layer and rendering such cutout portion of the appliqué layer, together with its repositionable appliqué adhesive, removable from the breakaway layer separately from a remainder of the appliqué layer outside of the cutout portion and without removing any portion of the breakaway layer.

2. The container set forth in claim 1, wherein the appliqué layer comprises a bi-axially oriented polypropylene face stock.

3. The container set forth in claim 1, wherein the appliqué layer further comprises a tab.

4. The container set forth in claim 3, wherein the tab is located at an edge of the appliqué layer.

5. The container of claim 4 wherein the container body has a convex exterior surface, the breakaway layer is coupled to the convex exterior surface, and the tab is configured such that it protrudes from the convex exterior surface of the container body so that it can be gripped for facilitating removal of the appliqué layer from the breakaway layer.

6. The container set forth in claim 1, wherein the appliqué layer comprises a plurality of cutout portions.

7. The container set forth in claim 1, wherein the repositionable appliqué adhesive is configured to remain with the appliqué layer after the appliqué layer is removed from the container and to permit repositionable application of the appliqué layer on a self-stick basis to another surface.

8. A container, comprising:
an appliqué layer having first and second sides, the first side having printing thereon;
a breakaway layer;
a repositionable appliqué adhesive between the second side of the appliqué layer and the breakaway layer, the repositionable appliqué adhesive being configured to remain with the appliqué layer if the appliqué layer or a portion thereof is removed from the breakaway layer;
a container body; and
a permanent breakaway adhesive coupling the breakaway layer with the container body,
wherein the appliqué layer includes at least one cut therethrough defining a cutout portion of the appliqué layer and rendering such cutout portion of the appliqué layer removable from the breakaway layer separately from a remainder of the appliqué layer outside of the cutout portion and without removing any portion of the breakaway layer.

9. The container of claim 8 wherein the container body has a convex exterior surface, the breakaway layer is coupled to the convex exterior surface, and the appliqué layer further comprises a tab at an edge of the appliqué layer, the tab being configured such that it protrudes from the convex exterior surface of the container body so that it can be gripped for facilitating removal of the appliqué layer from the breakaway layer.

10. The container of claim 8, wherein the cutout portion is defined by a plurality of knife cuts.

11. The container of claim 8, wherein the cutout portion is defined by a plurality of kiss cuts.

12. The container of claim 8, wherein the cutout portion includes a tab that is defined by the cuts to facilitate removal of the cutout portion from the remainder of the appliqué layer.

13. The container of claim 8, wherein the repositionable appliqué adhesive is configured to permit repositionable application of the appliqué layer on a self-stick basis to another surface.

14. A label, comprising:
an appliqué layer having first and second sides, the first side having printing thereon;
a breakaway layer;
a repositionable appliqué adhesive between the second side of the appliqué layer and the breakaway layer, the repositionable appliqué adhesive being configured to remain with the appliqué layer if the appliqué layer or a portion thereof is removed from the breakaway layer; and
a permanent breakaway adhesive coupling the breakaway layer with a surface of an object,
wherein the label includes at least one cut through the appliqué layer defining an interior cutout portion of the appliqué layer within an outer portion of the appliqué layer, the at least one kiss cut being configured such that the interior cutout portion of the appliqué layer defined by the at least one cut is separately removable from the breakaway layer without removing the outer portion of the appliqué layer and without removing any portion of the breakaway layer.

15. The label of claim 14 wherein both the interior cutout portion of the appliqué layer and the outer portion of the appliqué layer are removable from the breakaway layer.

16. The label of claim 14 wherein the surface of the object is a convex surface and the appliqué layer further comprises a tab at an edge of the appliqué layer, the tab being configured such that it protrudes from the convex surface of the object so that it can be gripped for facilitating removal of the appliqué layer from the breakaway layer.

17. The label of claim 14, wherein the interior cutout portion is defined by a plurality of knife cuts.

18. The label of claim 14, wherein the interior cutout portion is defined by a plurality of kiss cuts.

19. The label of claim 14, wherein the interior cutout portion includes a tab that is defined by the cuts to facilitate removal of the cutout portion from the outer portion of the appliqué layer.

20. The label of claim 14, wherein the repositionable appliqué adhesive is configured to permit repositionable application of the appliqué layer on a self-stick basis to another surface.

* * * * *